United States Patent Office 3,087,977
Patented Apr. 30, 1963

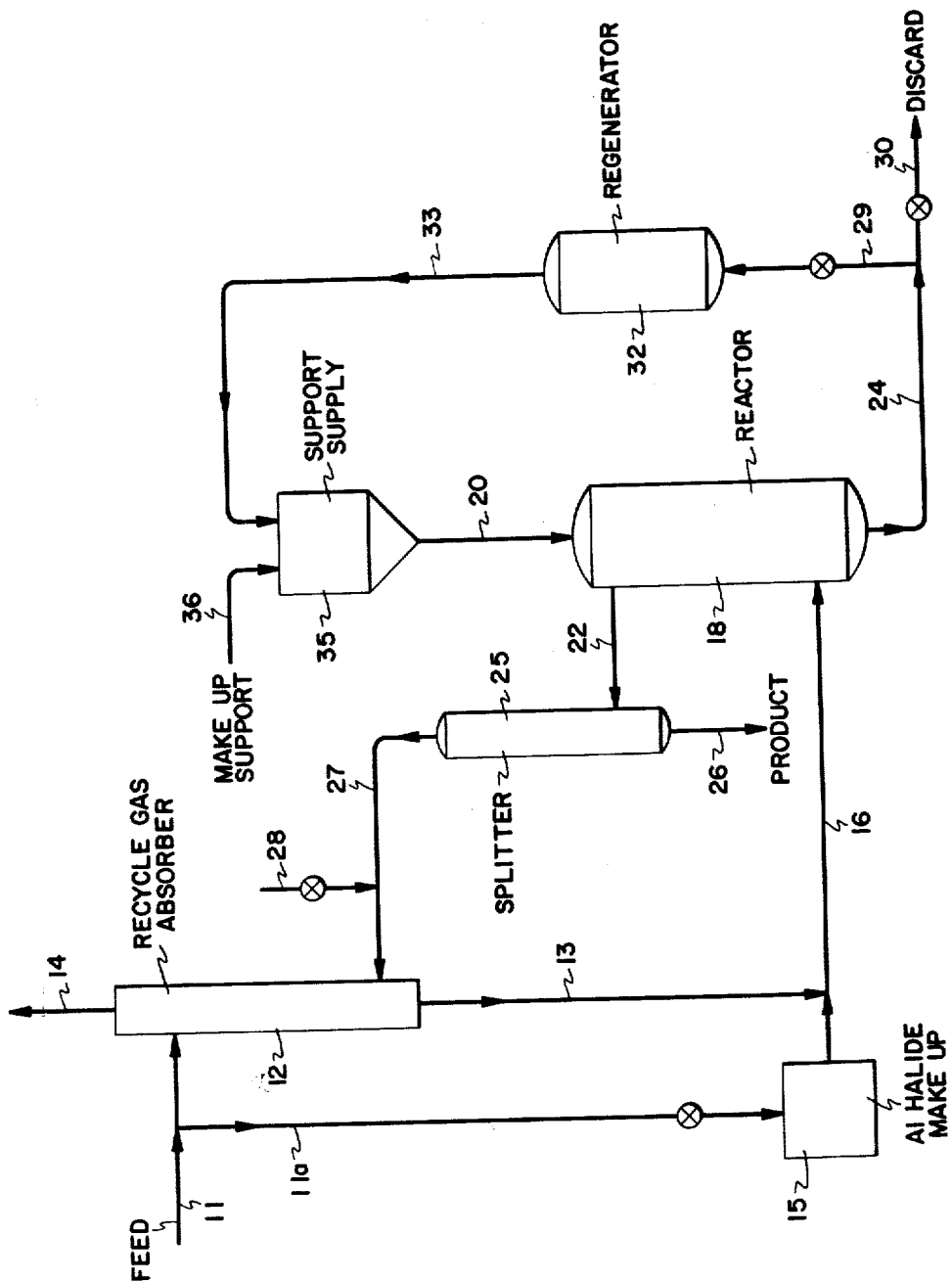

---

3,087,977
HYDRAULIC ISOMERIZATION WITH MOVING
BED CONTAINING ALUMINUM HALIDES
Lindsay I. Griffin, Jr., Kenneth Earl Draeger, and Wilfred James Braulick, Baton Rouge, La., assignors to Esso Research and Engineering Company, a corporation of Delaware
Filed Sept. 20, 1960, Ser. No. 57,340
8 Claims. (Cl. 260—683.7)

This invention relates to the isomerization of paraffin hydrocarbons in the presence of aluminum halides and preferably aluminum bromide. The invention is particularly directed to a process and system wherein paraffin hydrocarbons can be isomerized in the liquid phase with assurance that more consistent product quality will be obtained and a higher feed throughput for a given reactor volume can be realized than has been possible heretofore.

It is, of course, well known to subject straight chain paraffin hydrocarbons to a catalytic treatment under conditions that will result in conversion of the hydrocarbons to the corresponding branched chain isomers. Such treatment is of considerable value to a petroleum refiner because it provides a useful source of high octane rating components for use in aviation and automotive fuels. Friedel-Crafts catalysts and particularly the metal halides are especially adaptable to this process. Aluminum chloride and/or aluminum bromide are most frequently employed as catalysts for paraffin hydrocarbon isomerization and are ordinarily used in conjunction with certain promoters, such as the hydrogen halides or boron fluoride.

In the isomerization of light naphthas, temperatures of from about 40° to about 150° F. are most desirable, because in this temperature range the reaction equilibrium is directed toward the formation of those branched chain isomers that have the highest antiknock ratings. Aluminum bromide, particularly when it is associtted with a suitable support, has been found to be especially active as an isomerization catalyst in the range of temperatures mentioned. The supports include calcined bauxite, silica gel, alumina, activated carbon, and ferric oxide.

It has recently been recognized that while supported aluminum bromide is highly desirable as an isomerization catalyst, one of the disadvantages associated with its use is its tendency to lose activity with age. Thus, to maintain catalyst activity, it has been necessary to replace the catalyst from time to time with fresh catalyst. It is one object of the present invention to provide a system and a method of operation wherein catalyst activity can be maintained at an essentially constant level by continuous replacement with fresh catalyst.

In accordance with the present invention, the above object is accomplished by introducing a hydrocarbon feed containing dissolved aluminum halide into one end of a reaction zone, introducing a catalyst support into the opposite end of the reaction zone, flowing the hydrocarbon and the support in countercurrent contact within the reaction zone while maintaining liquid phase isomerization conditions within the reaction zone, and removing isomerized hydrocarbons and aluminum-halide-saturated support from opposite ends of the reaction zone. It is a particular feature of the invention that the dissolved aluminum halide contained in the entering hydrocarbon feed is in slight excess of the aluminum halide needed to saturate the entering support.

Reaction conditions suitable for effecting isomerization in accordance with this invention include temperatures of from 40° to about 150° F. and pressures sufficiently great to maintain the reacting hydrocarbons in the liquid phase. Feed rate, feed composition, percent $AlBr_3$, percent HBr, temperature, and intrinsic catalyst activity are all interrelated. However, operation of the isomerization process is usually carried out within the following ranges of operating variables. The ranges listed are for supported $AlBr_3$ catalyst.

| | |
|---|---|
| Catalyst age at discharge, days | 10–50 |
| $AlBr_3$ on feed, wt. percent | 0.1–0.5 |
| HBr on feed, wt. percent | 1–20 |
| Reaction temperature, °F | 40–150 |
| Feed rate, v./v./hr | 0.1–1.0 |

The nature of the invention and the manner in which it is to be practiced will be readily understood when reference is made to the accompanying drawing in which the single figure is a schematic flow plan illustrating one embodiment of the invention.

The process will be particularly described in connection with the use of aluminum bromide as the isomerization catalyst. The feed stream for the process is obtained from a suitable source by means of line 11. This feed stream may, for example, comprise a refinery hexane cut or a light naphtha feed which initially contains materials that might poison the catalyst. Among such materials are olefins, sulfur compounds, and aromatic hydrocarbons, such as benzene. It is desirable that such materials first be removed from the feed stock. This may be done by means not shown in the figure and may involve such steps as solvent extraction, extractive distillation, hydrogenation, or treatment with selective adsorbents, such as molecular sieve zeolites.

The treated naphtha feed entering through line 11 is first conducted to a recycle gas absorber and vent gas scrubber 12 where it is saturated with hydrogen halide which in this instance will comprise hydrogen bromide entering through recycle line 27. Small quantities of unwanted gases, such as methane and ethane produced in the process, may be vented via line 14. Make-up HBr and/or HBr needed for start-up can be supplied via line 28.

To supply $AlBr_3$ for the process, a portion of the feed stream is diverted by means of line 11a through an aluminum bromide pick-up zone 15 containing aluminum bromide in a suitable state for solution in the diverted stream. The effluent from absorber 12 is conducted by means of line 13 to feed line 16 which also receives the effluent from pick-up zone 15.

The feed containing dissolved aluminum bromide enters the bottom of reaction zone 18 and flows upwardly within that zone. A stream of catalyst support, which may suitably comprise calcined bauxite, known commercially as Porocel, enters the top of reaction zone 18 through line 20 and countercurrently contacts the hydrocarbon feed within the reaction zone. Other suitable supports have been mentioned supra. The relative rates of flow of catalyst support and of hydrocarbon feed are so regulated that the catalyst support becomes saturated with aluminum bromide as it flows downwardly through the reaction zone. To ensure that complete saturation is being attained, the hydrocarbon effluent leaving through line 22 should contain at least a trace of dissolved aluminum bromide.

The reaction product in line 22 is sent to a splitter tower wherein conditions are such as to separate hydrogen bromide from the product. The latter is removed through line 26 while the hydrogen bromide goes overhead through line 27 to the recycle gas absorber.

The saturated catalyst leaves reaction zone 18 through line 24 and may be sent to discard by means of line 30 or it may be sent to regeneration zone 32 by means of line 29. Any suitable method of reclaiming the support may be used in regeneration zone 32. For example, the spent catalyst may be neutralized with ammonia after which the complex of ammonia and aluminum bromide may be removed by water-washing, and the recovered support then dried. The dried support is then sent by means of line 33 to support-supply vessel 35. Make-up support may be added by means of line 36.

The minimum catalyst residence time in the reaction zone is of necessity very critical. This catalyst residence time is controlled by the rate at which the support is added and withdrawn from the reaction zone. If the support addition rate is too great for the rate of $AlBr_3$ addition, all of the $AlBr_3$ will be absorbed on the support at the very bottom of the reaction zone and thus be quickly withdrawn. This will leave the reaction zone essentially filled with support free of $AlBr_3$. The support is active as a catalyst only when it contains adsorbed $AlBr_3$. Hence this situation will result in an inactive catalyst system. If on the other hand, the rate of $AlBr_3$ addition is in excess of that that can be adsorbed on the support that is added to the system, the $AlBr_3$ adsorption will take place at the top of the reaction zone, thus giving an active catalyst throughout the reaction zone. For a given $AlBr_3$ addition rate, which is limited to the range of 0.1 to 0.5 wt. percent on feed by economic considerations, there is a maximum support addition rate (hence a minimum catalyst residence time at a given v./v./hr.) which can be employed. Higher support addition rates will give an inactive system as discussed above. As shown in Example 1, this maximum support addition rate will result in a minimum catalyst age at discharge that is of the magnitude of many days. For trouble-free operations it will be necessary to have a support addition rate slightly lower than the maximum value which will give a trace of $AlBr_3$ in the effluent product. This will give a catalyst age at discharge slightly higher than the minimum critical value.

The conditions for the isomerization process of this invention and the advantages for this operation are given in the following examples:

EXAMPLE 1.—MOVING BED OPERATION

Hydrogenated light naphtha ($C_5/C_6$) is isomerized at 100° F. in a moving bed operation with a catalyst consisting of $AlBr_3$ on Porocel. Of the paraffin $C_6$ contained in the feed, 39.6% is $nC_6$. 10 wt. percent HBr and 0.3 wt. percent $AlBr_3$ are added with the feed to obtain sufficient catalyst activity to yield a product containing only 10% of the paraffinic $C_6$ as $nC_6$. These conditions and results are obtained in all of the cases shown in Table I. Magnitude of the operation is 5000 b./d. of feed.

Table I

| | | | | |
|---|---|---|---|---|
| Catalyst Age at Discharge, Days | 26.5 | 30 | 40 | 50 |
| First Order Isomerization Rate Constant, $kC_6$ | 0.61 | 0.59 | 0.54 | 0.52 |
| Feed Rate, V./V./Hr | 0.342 | 0.331 | 0.305 | 0.289 |
| Volume of Catalyst, Ft.³ | 3,420 | 3,540 | 3,840 | 4,050 |
| Reactor Diameter, Ft | 8 | 8 | 8 | 8 |
| Reactor Height, Ft | 68.0 | 70.4 | 76.4 | 80.6 |
| Porocel Rate: | | | | |
| Lbs./Bbl | 1.44 | 1.32 | 1.08 | 0.91 |
| Inches/Hr. in Reactor | 1.28 | 1.18 | 0.96 | 0.81 |
| $AlBr^3$ Added, Lbs./Bbl | 0.72 | 0.72 | 0.72 | 0.72 |
| $AlBr^3$ in Product, Percent of Entering $AlBr^3$ | 0 | 8 | 25 | 36.7 |

EXAMPLE 2.—CONVENTIONAL FIXED BED OPERATION

Hydrogenated light naphtha ($C_5/C_6$) is isomerized at 100° F. in a conventional fixed bed reactor train consisting of 3 or 4 reactors in series each filled with catalyst consisting of $AlBr_3$ on Porocel. This catalyst is prepared by saturating the Porocel with $AlBr_3$ (50 wt. percent adsorption). Of the paraffinic $C_6$ contained in the feed, 39.6% is $nC_6$. 0.3 wt. percent $AlBr_3$ and sufficient HBr are added to the feed to give the catalyst activity necessary to yield a constant quality product containing only 10% of the paraffinic $C_6$ as $nC_6$. During the run catalyst deactivation is offset by gradually increasing the HBr concentration to a maximum of 10 wt. percent which is reached at the end of the run. These conditions and results are reached at all of the following conditions. As in Example 1, the magnitude of the operation is 5000 b./d. of feed.

Table II

| Type Operation | Conventional Fixed-Bed Operation | | | | Moving Bed Operation [1] | |
|---|---|---|---|---|---|---|
| Run Length, Days | 26.5 | 50 | 180 | 365 | | |
| Catalyst Age at Discharge, Days | 26.5 | 50 | 180 | 365 | 26.5 | 50 |
| First Order Isom. Rate Constant $KC_6$ | 0.42 | 0.33 | 0.19 | 0.14 | 0.61 | 0.52 |
| Feed Rate, V.V./Hr | 0.234 | 0.186 | 0.107 | 0.080 | 0.343 | 0.289 |
| Volume of Catalyst, Ft.³ | 5,000 | 6,290 | 10,930 | 14,620 | 3,420 | 4,050 |
| Initial Catalyst Charge M lbs.: | | | | | | |
| Porocel | 281 | 353 | 614 | 821 | | |
| $AlBr_3$ | 140 | 176 | 307 | 410 | | |
| $AlBr_3$ Charged During Operations, Lbs./Bbl | 0.72 | 0.72 | 0.72 | 0.72 | 0.72 | 0.72 |
| Total Catalyst Consumption During Run, Lbs./Bbl.: | | | | | | |
| Porocel | 2.12 | 1.41 | 0.69 | 0.45 | 1.44 | 0.91 |
| $AlBr_3$ | 1.78 | 1.42 | 1.06 | 0.94 | 0.72 | 0.72 |
| $AlBr_3$ in Reactor Effluent, Lbs./Bbl | 0.72 | 0.72 | 0.72 | 0.72 | 0 | 0.26 |

[1] For comparative purposes only. Taken from Table I.

A comparison of the above two examples shows that the moving bed process of the present invention requires a much lower catalyst volume than the conventional fixed bed process. $AlBr_3$ consumption in this moving bed process is much less than in the conventional fixed bed process even though the length of the run in the conventional process is increased to minimize $AlBr_3$ consumption. Support consumption in the moving bed process of this invention is also much less than in the conventional fixed bed process when operating to a constant catalyst age at discharge. The consumption of support can be reduced greatly in the fixed bed process by increasing run length and can be, under certain circumstances, lower than in the moving bed process. The price of a support such as Porocel is quite low, particularly when compared to the price of $AlBr_3$. Therefore, the cost of the support is only a very minor part of the operating costs of the plant. These advantages for the moving bed process make it much more attractive than the fixed bed process.

It will be understood that if the support is reclaimed from the removed catalyst by separating aluminum halide from it, as described, complete separation of halide from support may not be necessary before the support is recycled to the reaction zone, because in some instances it has been found possible to regain full catalyst activity by removing only a portion of the aluminum halide from the support. It is thus within the purview of the present invention to employ support recovery techniques which remove all of the adsorbed aluminum halide as well as techniques which remove less than all of the adsorbed aluminum halide before the reclaimed support is recycled to the reaction zone.

It will also be understood that the examples presented are not intended to limit the invention but merely to illustrate the same. The scope of the invention is to be determined by the claims hereto appended.

What is claimed is:

1. In the isomerization of paraffin hydrocarbons in the presence of an aluminum halide on a support, the improvement which comprises introducing hydrocarbon feed containing dissolved aluminum halide into a first end of a reaction zone, introducing catalyst support into the opposite end of said reaction zone, flowing said hydrocarbons and said support in countercurrent contact within said reaction zone, maintaining conditions within said reaction zone effecting liquid phase isomerization of said hydrocarbons, removing isomerized hydrocarbons from said opposite end of said reaction zone, and removing catalyst comprising said support saturated with aluminum halide from said first end of said reaction zone.

2. Process as defined by claim 1 wherein the rate of support addition is correlated with the feed rate of hydrocarbon and the concentration of aluminum halide in the hydrocarbon feed to result in at least a trace of aluminum halide in the hydrocarbon effluent from the reaction zone.

3. Process as defined by claim 1 wherein said support is substantially devoid of aluminum halide as it enters said opposite end of the reaction zone.

4. Process as defined by claim 1 wherein said aluminum halide comprises $AlBr_3$.

5. Process as defined by claim 1 wherein said reaction conditions include temperatures in the range of 40 to 150° F.

6. Process as defined by claim 1 wherein said catalyst removed from the reaction zone has been present in said reaction zone for a period within the range of 10 to 50 days.

7. Process as defined by claim 1 wherein said hydrocarbon feed contains from 0.1 to 0.5 weight percent of $AlBr_3$ dissolved therein.

8. Process as defined by claim 1 including the steps of reclaiming support from said removed catalyst by separating aluminum halide therefrom and recycling said reclaimed support to said opposite end of said reaction zone.

References Cited in the file of this patent

UNITED STATES PATENTS

| | | |
|---|---|---|
| 2,346,294 | Danforth | Apr. 11, 1944 |
| 2,433,079 | Whiteley et al. | Dec. 23, 1947 |

UNITED STATES PATENT OFFICE
CERTIFICATE OF CORRECTION

Patent No. 3,087,977                                          April 30, 1963

Lindsay I. Griffin, Jr., et al.

It is hereby certified that error appears in the above numbered patent requiring correction and that the said Letters Patent should read as corrected below.

In the heading to the sheet of drawing, and in the heading to the printed specification, title of invention, for "HYDRAULIC ISOMERIZATION WITH MOVING BED CONTAINING ALUMINUM HALIDES", each occurrence, read -- HYDROCARBON ISOMERIZATION WITH MOVING BED CONTAINING ALUMINUM HALIDES --.

Signed and sealed this 19th day of November 1963.

(SEAL)
Attest:

ERNEST W. SWIDER

Attesting Officer

EDWIN L. REYNOLDS

Acting Commissioner of Patents